US012486974B2

United States Patent
Stallings et al.

(10) Patent No.: US 12,486,974 B2
(45) Date of Patent: Dec. 2, 2025

(54) SECURITY FLASHLIGHTS WITH THREAT DETECTION

(71) Applicant: Smart Home Protection LLC, San Diego, CA (US)

(72) Inventors: Jeromy Stallings, San Diego, CA (US); David Szekeres, San Diego, CA (US); Robert Ira Hayes, San Diego, CA (US)

(73) Assignee: Smart Home Protection LLC, San Diego, CA (US)

( * ) Notice: Subject to any disclaimer, the term of this patent is extended or adjusted under 35 U.S.C. 154(b) by 0 days.

(21) Appl. No.: 18/668,957

(22) Filed: May 20, 2024

(65) Prior Publication Data

US 2024/0426470 A1 Dec. 26, 2024

Related U.S. Application Data

(60) Division of application No. 17/876,386, filed on Jul. 28, 2022, now Pat. No. 12,018,824, which is a continuation-in-part of application No. PCT/US2021/015460, filed on Jan. 28, 2021.

(60) Provisional application No. 62/966,944, filed on Jan. 28, 2020.

(51) Int. Cl.

| | |
|---|---|
| ***F21V 23/04*** | (2006.01) |
| ***F21V 33/00*** | (2006.01) |
| ***H05B 47/19*** | (2020.01) |
| *F21L 4/00* | (2006.01) |

(52) U.S. Cl.

CPC ...... *F21V 23/0414* (2013.01); *F21V 33/0052* (2013.01); *H05B 47/19* (2020.01); *F21L 4/005* (2013.01)

(58) Field of Classification Search

CPC .. F21V 23/0414; F21V 33/0052; F21V 23/00; F21V 33/00; H05B 47/19; H05B 47/175; F21L 4/005; F21L 4/00

See application file for complete search history.

(56) References Cited

U.S. PATENT DOCUMENTS

2016/0360585 A1* 12/2016 Urry ........................ F21V 33/00
2019/0072835 A1* 3/2019 Lee ........................ G03B 29/00

* cited by examiner

*Primary Examiner* — Bao Q Truong
(74) *Attorney, Agent, or Firm* — Perkins Coie LLP

(57) ABSTRACT

A rechargeable flashlight configured to communicate via a wireless network, and associated systems and methods are disclosed herein. In some embodiments, the rechargeable flashlight includes a light emitter configured to generate light outputted by the flashlight and an imaging device configured to capture environmental data from an area exposed to the output light. The flashlight can also include a cylindrical handheld main body that includes one or more functionally distinct modules configured to be detachably coupled together to provide coordinated operation. The flashlight can also include at least one user-controlled switch operable to control operation of one or more of the interchangeable cylindrical modules.

18 Claims, 7 Drawing Sheets

SECURITY FLASHLIGHTS WITH THREAT DETECTION

CROSS REFERENCE TO RELATED APPLICATIONS

This application is a division of U.S. patent application Ser. No. 17/876,386 filed Jul. 28, 2022, which is a continuation-in-part of International Patent Application No. PCT/US21/15460 filed Jan. 28, 2021, which claims the benefit under 35 U.S.C. § 119 (e) of U.S. Provisional Application No. 62/966,944 filed Jan. 28, 2020, the disclosures of which are incorporated by reference in their entireties.

TECHNICAL FIELD

The present technology relates to connected devices, security devices, and surveillance systems. In particular, the present technology relates to handheld flashlights configured for wireless communication, threat detection, personal protection, environmental analysis, and/or surveillance.

BACKGROUND

Americans spend billions of dollars per year on home security systems that include cameras, motion sensors, alarms, and a connection to emergency services. Flashlights can be an important part of the home security system, allowing the user to tactically deploy light, illuminate insecure areas, and try to disorient assailants. Unfortunately, other communication devices are often needed to provide a connection to the security system and any emergency responders. Flashlights are also an important part of a basic emergency kit, which can be vital for survival in an emergency situation. The flashlight can provide light when no other light source is available. However, other devices are needed to detect and respond to hazards during the emergency. Flashlights are also frequently carried by personnel in a workplace setting to illuminate dark areas of the workplace, aiding in maintenance functions and security. Unfortunately, separate devices need to be carried to record environmental data, as well as to detect and avoid threats and hazards.

SUMMARY

In some embodiments, a rechargeable flashlight includes at least one light emitter configured to generate light and one or more sensors (e.g., an imaging device, a microphone device, a particle counter, a light detector, a gas sensor, environmental sensor, and/or other suitable sensor) configured to capture data. The flashlight can include a cylindrical main body configured to be gripped by a user. The flashlight can communicate wirelessly with one or more devices. For example, the flashlight can capture environmental data and transmit the environmental data to a user's mobile device, another device monitoring the user, another flashlight, a base, and/or a cloud/remote server. The flashlight can have a siren, an alert or SOS module, beacon, and/or other components controlled using switches, buttons, sliders, voice controllers, or the like. The flashlight can also have a display feature that can display data, image(s), status, and/or notifications. The display feature can include a screen or another digital display element. The flashlight can detect threats, output warns/alerts, provide surveillance, and otherwise protect a user carrying the flashlight. For example, the flashlight can identify security threats by analyzing captured video and then alert (e.g., via vibration, audible alert) the user. The flashlight can provide surveillance by capturing video, images, noise, or other data that is stored locally and/or remotely. In some personal protection embodiments, the flashlight can output noise from an internal siren, disorienting light, or other output that can help the user escape the threat, such as potential attackers. The flashlight can analyze the environmental data to monitor air quality, detect emissions, identify air quality threats, and/or a presence of pathogens in the environment. The flashlight can analyze the environmental data to identify other environmental threats or events. For example, the flashlight can analyze the environmental data to alert the user when noise levels exceed a predetermined threshold likely to permanently or temporarily harm the user's hearing. In some environments, the flashlight can analyze environmental data (e.g., noise data, image data, and/or video data), to identify, for example, crowd movement, gunshots, explosions, or the like. Notifications, alerts, and/or instructions can be sent based on the location of the flashlight (e.g., location relative to the crowd), location of the gunshot or explosion, etc. In some embodiments, the flashlight can analyze the environmental data to alert the user and/or send a notification when a detected noise level exceeds a predetermined threshold indicating a trigger event (e.g., discharge of a firearm, an explosion, etc.). The predetermined threshold can be selected by the user, a remote monitoring center, AI/ML algorithm(s), etc. In response to the detected trigger event, the flashlight can take one or more actions, including recording data (including data before, during, and/or after the trigger event), transmitting captured data, locally processing data (e.g., process captured environmental data, data from other flashlights, etc.), sending notifications/alerts, alerting a user, etc. The actions can be selected by, the user, a remote monitoring center, AI/ML algorithms, etc. In some embodiments, mesh-networked flashlights cooperate to locally triangulate detected noises using edge computing, machine learning, or the like. In some implementations, captured data can be identified and/or annotated and automatically sent to a monitoring center in response to a detected event, such as a gunshot, triggering of an alarm system, etc.

The flashlight can include functionally distinct modules detachably coupled together. The modules can communicate with one another to enable coordinated operation via a wired or wireless connection to provide desired functionality, including protection, security, surveillance, environmental assessments, or combinations thereof. For example, a surveillance module with a single camera can be replaced with another surveillance module with multiple cameras. The modules can be authenticated by another module, base stations, hubs, gateways, smartphones, controllers, endpoint devices (e.g., security system endpoint devices), or the like. This allows reconfiguration of the flashlight any number of times to update functionality.

The modules can include one or more receivers/transmitters, light emitters, imaging devices, motion sensors, proximity sensors, microphones, speakers, motion detectors, particle counters, gas sensors, and/or chemical sensors. Example modules are surveillance modules, recording modules, siren modules, speaker modules, computing modules, and/or communication modules. A surveillance module, for example, can include an imaging device (e.g., one or more cameras, thermal imagers) and light emitters. Imaging data (e.g., video, still images, thermal images) from the imaging device can be used to detect objects, analyze individuals, or otherwise analyze a surveillance area. For example, the flashlight can detect objects and identify those objects, such as weapons. To limit power consumption, the flashlight can capture imaging data in response to event detection (e.g., motion within a detection zone). A user can use a smart phone, remote computer, voice commands, or computing device to provide one or more settings and/or event detection rules. The surveillance module can also include one or more microphones and speakers for two-way communication. Recording modules can store data for retrieval. Siren modules can output loud noises. Computing modules can analyze data locally. Communication modules can enable communications via wired connections, wireless connections, or the like. Connection interfaces of the modules can be geometrically congruent for interchangeability of the modules. The number, configuration, and functionality of modules can be selected based on the desired functionality.

In some embodiments, the flashlight can include a controller programmed to send the captured environment data to a remote service to enable viewing (remote and/or local viewing) of the captured environmental data. The controller can include one or more processors and memory with executable instructions (e.g., executed by the one or more processors) to detect an event based on captured environmental data. In response to event detection, the controller can cause one or more modules of the flashlight to perform one or more actions. In some embodiments, the captured environmental data can be viewed by a monitoring center or viewed by a user via a computer, a mobile device, or the like. In some embodiments, captured environmental data can be communicated to another component (e.g., a local or remote component) of a surveillance system. Predetermined action(s) can be performed based on analysis of the captured data or triggers from the flashlight. For example, if an intruder within a surveillance area is detected, notifications can be sent to, for example, a monitoring center, local police, or the like.

In further embodiments, a flashlight can be configured to communicate via a wireless network and can include a surveillance module and a control module. The surveillance module can include a light emitter. A camera can be used to capture images or video of an area illuminated by the light emitter. The control module can be detachably coupled to the surveillance module and can cause the flashlight to communicate via a wireless network based, at least in part, on the images and/or video captured by the camera. The flashlight can include one or more control elements (e.g., buttons and switches) positioned to be operated by a user's hand holding the flashlight.

In further embodiments, a flashlight can include functionally distinct modules. Each module can include a central processing unit, memory, input devices (e.g., control elements, keyboards, touchscreens), output devices (e.g., speakers, sirens, display devices), storage devices (e.g., disk drives), power sources, and various other software and/or hardware components. The central processing unit can be a micro controller. The modules can communicate via a wired or wireless connection. For example, the modules can communicate with one another via a wired connection. At least one of the modules can communicate with another component or wireless network via a wireless connection.

A battery power assembly and selector switch ring module can include one or more power sources. The power sources can be batteries capable of powering the entire device for a predetermined amount of time (e.g., 20 minutes, 30 minutes, 45 minutes, an hour), for example, when all functionality is activated. The battery can be rechargeable and placed in the base for recharging or recharged through a plug (e.g., a plug for an AC power outlet or source). Alternatively, the flashlight can be placed in the base or battery module for recharging. The base or battery module can have a selector button to turn on/off light, camera, and sound. The base or battery module can have one or more selector buttons to turn on/off light, camera, and/or sound. The flashlight can also be charged without the base (e.g., a base charging station) through a power cord, through wireless charging stations, or alternative energy harvesting methods (e.g., antenna waveguide harvesting methods or wireless charging). The flashlight can operate independent of the base or battery module, and the base charging system can operate independent of the flashlight. The base charging station can have one or more backup power sources, such as batteries.

In yet further embodiments, a flashlight can have a flashlight-only mode for outputting light, a surveillance mode for capturing surveillance data, and a request assistance mode. In the flashlight-only mode, the flashlight outputs light without capturing surveillance data. This can reduce power consumption. The surveillance data includes video, still images, acoustical data, or combinations thereof. In the request assistance mode, the flashlight is configured to send a request (e.g., an SOS request) or notification in response to a user moving a switch or depressing a button.

DETAILED DESCRIPTION

Figure 1:
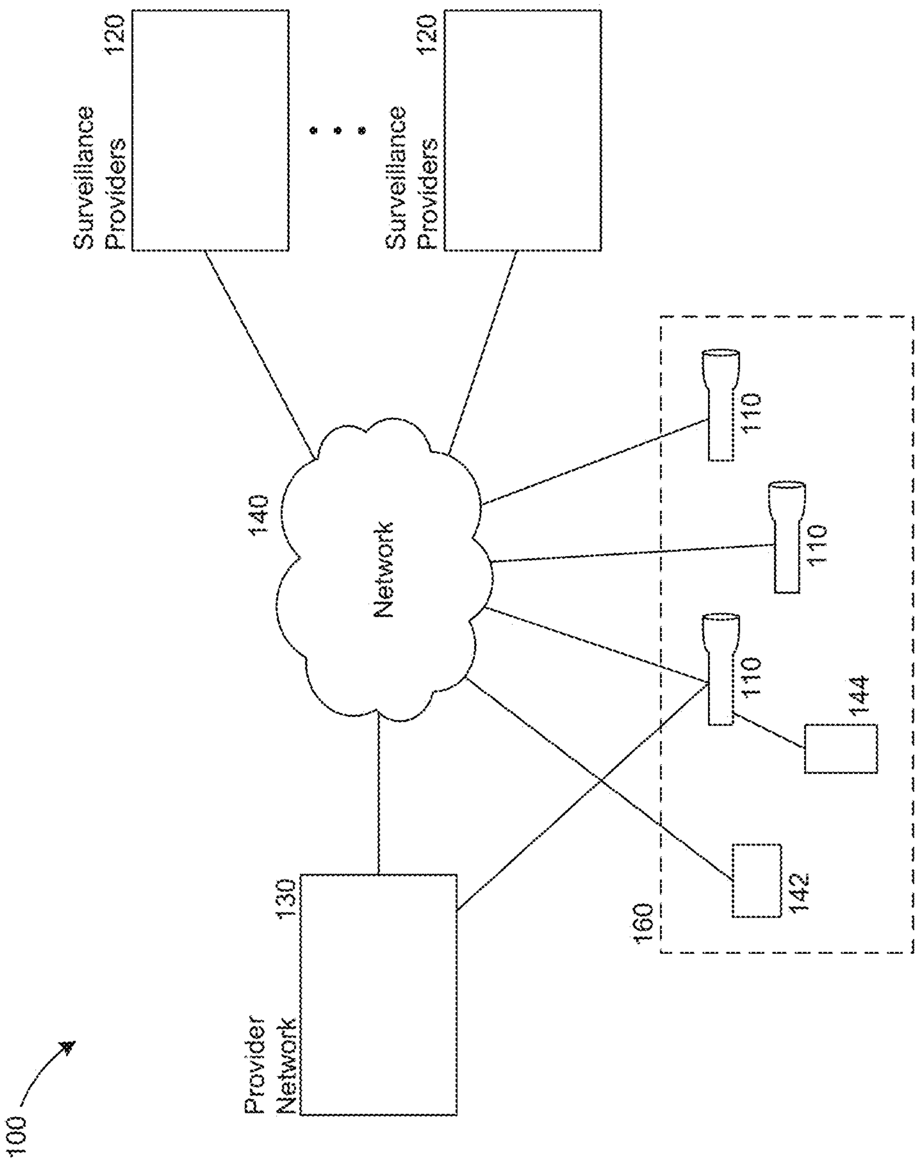
FIG. 1 is a block diagram illustrating an environment in which the disclosed technology may operate.

FIG. 1 is a block diagram illustrating an environment 100 in which the disclosed techniques may operate according to some embodiments of the present technology. The environment 100 can include flashlights 110, surveillance providers 120, a provider network 130, and a network 140. The network 140 can be a local area network (LAN) or a wide area network (WAN). The flashlights 110 are a part of a security system 160 and can communicate (e.g., via the network 140 or mobile device 144) with surveillance providers 120, the provider network 130, and/or a connected device 142. The flashlights 110 can capture video, still images (including thermal images), motion, audio, air quality data, gas data, particle count data, pathogen data, and/or other data analyzed locally and/or remotely to detect, for example, threats, individuals, or other desired information. For example, the flashlight 110 can analyze video to detect an intruder (e.g., an individual within a predefined boundary, an individual when the flashlight 110 is in detection mode) and perform one or more actions based on the identification.

The actions can include notifying local authorities (e.g., police departments, security teams) of the intrusion. In another example, the flashlight 110 can analyze the particle count information to detect unsafe levels of a harmful chemical (e.g., carbon monoxide) and perform one or more actions based on the identification. The actions can include alerting the user to the presence of the harmful chemical and/or measuring an exposure time.

The flashlights 110 can monitor an area with or without network connectivity. This enables operation of the flashlight 110 independent from access to wireless networks and/or peripheral devices. For example, the flashlight 110 can detect security threats when the user is not within network range, such as when running, hiking, walking, etc. When the flashlight 110 is capable of connecting to the network 140, the flashlight 110 can automatically reestablish wireless communication with the local gateway/router to send data to the surveillance providers 120. The surveillance providers 120 can analyze data captured by the flashlight 110 to identify objects (e.g., weapons, individuals, landmarks, animals), send instructions to the flashlights 110 (e.g., instructions to start an audible or visual alert), alert users (e.g., cause intruder alerts to be sent to user's mobile device 144), enable remote viewing of data, or combinations thereof. In some embodiments, the flashlight 110 is capable of automatically analyzing the data to identify objects, retrieve stored instructions (e.g., pre-determined instructions, such as general recommendations), and alert the users. For example, while hiking, the flashlight 110 can identify a predatory animal in the image data, alert the user to the presence of the predatory animal, and provide the user with instructions to navigate away from danger. The mobile device 144 can be a smartphone, a tablet, or a computer. In some embodiments, the mobile device 144 can be a smart phone with an application for controlling the flashlights 110. A user can input settings, configurations, or otherwise control operation of the flashlights by inputting information via GUI associated with mobile application. The application can also be used to authenticate and pair with the flashlights 110. In some embodiments, one or more features of the flashlights 110 are inoperable until pairing with the mobile device 144. In some embodiments, a user can input information (e.g., password, code, biometric information) to unlock or enable functionality of the flashlight 110.

In some embodiments, the flashlight 110 can include a virtual assistant capable of receiving voice commands and can include one or more controllers with artificial intelligence functionality or other suitable functionality. For example, the controller can include or be compatible with hubs or automation devices (e.g., Google Home, Amazon's Alexa, etc.), or other suitable devices for receiving input from users. Voice commands can be used to set alarms, send SOS notifications, control functionality (e.g., mapping functionality), or the like.

The flashlight 110 can integrate with existing alarm systems associated with surveillance providers 120, can provide additional capabilities, and can be integrated with various carrier provider services for mobile phone interactivity via the network 130. Additionally, the flashlight 110 can include transmitters/receivers, GPS components for GPS services, beacon services, geofencing, etc. The flashlight 110 can be configured for recording, monitoring, remotely notifying, remotely controlling, and alerting emergency service providers and remote call centers/surveillance providers 120 of danger when in use. When a trigger event is detected, the flashlight 110 can automatically record and transmit the data. The trigger event can include, without limitation, motion detection, person detection, identification of a person, threat identification, or the like. The trigger event can be detected by the flashlight 110 or another component in proximity to the flashlight. A user can set rules for determining actions performed by the flashlight 110 based on detection of the trigger event.

The security system 160 can provide home automation control based on the position(s) of and/or output from the flashlights 110, triggers from the flashlights 110, or the like. The flashlights 110 can have one or more wireless interfaces for communicating via LANs (e.g., Wi-Fi networks, X10-based networks, mesh networks), a personal area network (PAN), WANs (e.g., cellular network), etc. For at home use, the flashlight 110 can communicate via a Wi-Fi network and/or mesh networks (e.g., Z-Wave-based networks, Zigbee-based networks). If the network 140 is a Wi-Fi network, the flashlights 110 can include one or more wireless components for communicating according to the IEEE 802.11 standard and/or other wireless communication standard(s). The flashlight 110 can also function as repeater for Z-Wave communications. Video and/or audio can be transmitted via a Wi-Fi network or Zigbee network. Flashlights 110 can also include one or more components for communicating via a cellular network. The flashlights 110 can communicate wirelessly with routers, hubs, smartphones, towers, or other local communication devices or endpoint devices. When out of range of the wireless network, the flashlights 110 can communicate via a nearby smartphone, computer, tablet, cellular network, or the like. One or more features of the flashlight 110 can be enabled based on authentication of the nearby device. This prevents unauthorized users from being able to operate the flashlight 110. The number of features enabled by authorization can be selected based on the available features and authorization requirements set by the user or provider.

Each flashlight 110 can join a network by sending a communication indicating its presence. The communication can be sent directly to a gateway, a smart hub, or a network. In other embodiments, the initial communication can be sent through one or more other surveillance devices, such as device 142 or mobile device 144. The flashlight 110 can be authorized and authenticated based on the communication. In some embodiments, the flashlights 110 can communicate with the mobile device 144, which manages communications via the wireless network 140 or another network.

The flashlights 110 can communicate via the same or different wireless channels. In some embodiments, the flashlights 110 can be configured to wirelessly communicate with each other through a direct wireless communication to expand the wireless network. Operation of flashlights 110 can be controlled based on the trigger event detected by another one of the flashlights 110. Trigger events can be detected based on one or more settings. Nonlimiting exemplary settings can include, without limitation, detection zones, sensitivity levels, thresholds. Software can be used to process (e.g., via one or more image processing algorithms) and analyze captured data to generate a report that is viewable by a user. To extend the networks, the flashlights 110 can communicate via a mesh protocol to maintain a mesh network. This enables the flashlights 110 to communicate within a relatively large area when multiple flashlights are used by, for example, a group of people (e.g., a SWAT team, security team, emergency service team, first responders).

A remote server can cause the flashlights to send captured environmental data to the surveillance providers 120, provider network 130, and/or network 140. The security system 160 can be monitored or unmonitored and may include any number of endpoint devices in the form of motion sensors, cameras, contact sensors, water sensors, or other components with one or more USB ports (interfaces), a wireless network interface via a Wi-Fi LAN access point, and/or a wired LAN connection such as provided by an Ethernet LAN interface.

Figure 2:
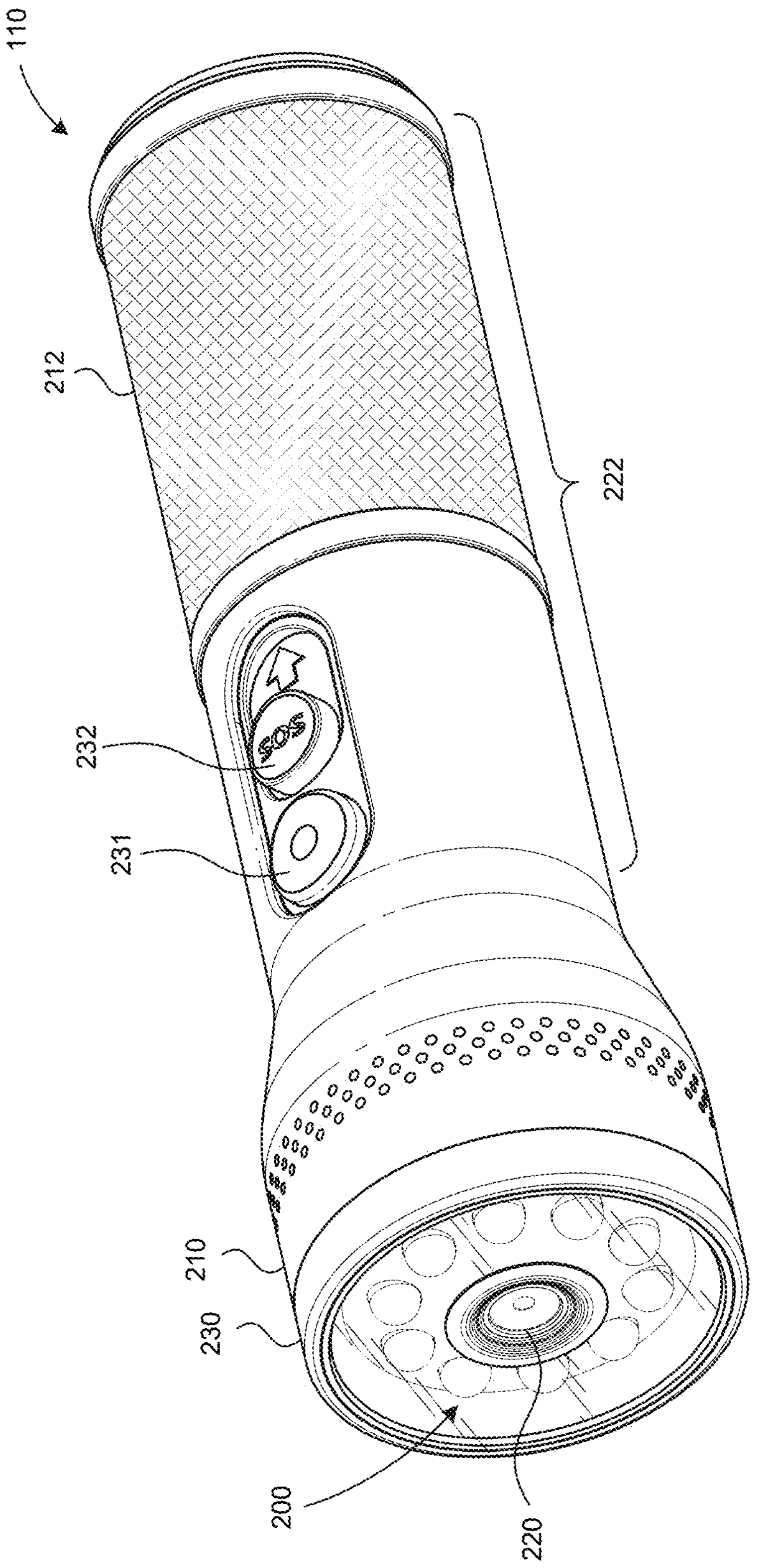
FIG. 2 is an isometric view of a flashlight in accordance with embodiments of the disclosure.

FIG. 2 is an isometric view of the flashlight 110 in accordance with embodiments of the disclosure. In the illustrated embodiment, the flashlight 110 includes a main module 210 and a single removable module 212 that removably connects to the main module 210 to define a cylindrical handle region 222 configured to be gripped by a user. The module 212 can be replaced with and/or communicatively connect with another module to reconfigure the flashlight 110. In some embodiments, for example, two, three, or any suitable number of modules can be connected in the handle region 222 (see, e.g., FIG. 6, below). Each module 212 can have one or more functionalities to expand the use of the flashlight 110. For example, as described in more detail below, each module 212 can include one or more of the following capabilities: siren speaker, emergency help requesting, object detection, animal detection, facial recognition, person detection, security detection (e.g., weapon detection, intruder detection, etc.), environmental data detection, chemical analysis, pathogen detection, GPS location, voice control, internet of things (IoT) connection, machine learning, edge computing, and/or various other suitable capabilities. The number and functionality of the modules can be selected based on the desired functionality for the flashlight 110. The module 212 can be connected to the main module 210 and/or various additional modules (not shown) through mechanical connections. The mechanical connections can include, without limitation, one or more twist locks, lever locks, mechanical connectors, electrical connectors (e.g., pins, plugs), and/or other elements that enable power to be delivered to each connected module. Further, the mechanical connections allow the user to add and/or change modules with minimal tools or effort. The connection interfaces and mechanical connections of modules can be geometrically congruent for module interchangeability.

As further illustrated in FIG. 2, the main module 210 includes a light emitter 200 having one or more light emitting diodes (LEDs), incandescent light bulbs, lasers, or other light sources. In the illustrated embodiment, the light emitter 200 includes a circular array of spaced apart LEDs. The position, number, and characteristics of the LEDs can be selected based on the desired light generating capabilities and/or desired environmental measurements. In some embodiments, for example, the light emitter 200 includes one or more infrared emitters that can assist with capturing image data (e.g., video or still images). In the illustrated embodiment, the main module 210 also includes an imaging device 220 configured to capture image data. The imaging device 220 can include one or more cameras (e.g., visible light cameras, infrared cameras, fluorescence detectors, LiDAR devices) positioned to capture data for an area or zone illuminated by the light emitter 200. In the illustrated embodiment, the light emitter 200 and the imaging device 220 are carried by a light and imaging module 230 that can be changed by the user independent of the main module 210. For example, the user can change the light and imaging module 230 if an upgraded unit comes out, if the previous light and imaging module 230 is damaged, and/or to alter the capabilities of the light emitter 200 and/or the imaging device 220. In some embodiments, the light and imaging module 230 includes one or more thermal imaging cameras (not shown) that allow the flashlight 110 to measure and record heat signatures using, for example, thermal imaging techniques. For example, both optical and thermal detection can be performed at the same time to enhance the detection and measurement capabilities of the flashlight 110.

As further illustrated in FIG. 2, the main module 210 includes user-controlled switches 231, 232. The switch 231 can be used to turn the light emitter 200 off and on. The switch 232 can be used to cause a signal (e.g., an SOS signal) to be sent. Additionally, or alternatively, the switch 232 can be used to at least partially control operation of one or more of the interchangeable cylindrical modules (e.g., module 212) that can be communicatively interlocked with the main module 210. Additional details on examples of the modules that can be attached to the main module 210 are set out below.

In some embodiments, the module 212 includes a siren module with one or more siren speakers able to emit audible notifications. The notifications can notify subjects that they are being recorded or that another party (e.g., emergency services such as police, security, medical services, etc.) is on their way. The module 212 can also provide two-way communication (e.g., via a speaker and a microphone for calls) with emergency services allowing the user to update the emergency services while they are in route. In some embodiments, the siren speakers can also emit sounds configured to disorient attackers or otherwise worn off potential danger. In some embodiments, the siren module can include a memory storing situation-specific instructions for the user. The notifications from the siren speakers can provide the stored instructions to the user. For example, the instructions may indicate a predetermined course of action in response to an identified assailant to provide to the user for guidance. In some embodiments, the siren module includes a beacon mode. When the beacon mode is activated, the flashlight 110 can cause an emergency alert to be sent to one or more contact(s) on a contact list. For example, the beacon mode can be used to alert emergency medical service of an accident and summon a medical response unit. In some embodiments, the siren modules can provide instructions or requests (e.g., request for additional information or commands). The instructions can be in response to one or more user requests. For example, the siren module can provide audible navigation, evacuation instructions, safety protocols, etc.

The functionality of the siren module can be initiated based on an input from the user (e.g., activating a switch on the flashlight 110 and/or a voice command input) and/or after analyzing environmental data collected by the flashlight 110. In some embodiments, the siren module can automatically analyze the images from the imaging device 220 to detect present objects (e.g., humans, animals, weapons, hazards, etc.). In some embodiments, the siren module can communicate the image data from the imaging device 220 to one or more external points for analysis and object detection. When an object is detected, the siren module can alert the user. For example, the siren module can issue a vibrating alert through the module 212, an audible alert through onboard speakers, and/or a visual alert through an onboard screen. In response, the user can provide an input indicating whether to engage further functionality of the siren module.

In some embodiments, the module 212 includes a user-authentication module. The user authentication module can include one or more biometric sensors (e.g., a finger print sensor, iris scanner, facial recognition module, voice recognition module, or any other suitable biometric sensor) that can automatically perform user-authentication. In some embodiments, the user authentication module includes an input module (e.g., a keypad, touchscreen, or other suitable input module) that can receive user credentials to perform user-authentication. In some embodiments, the user authentication module includes a wireless reader (e.g., an RFID reader, scanner, or other suitable reader) that can read a device associated with the user to perform user-authentication. The user authentication module can perform user-authentication before various functions of the flashlight 110 can be activated. For example, in some embodiments, the functions of the siren module discussed above can be activated only after the user authentication module confirms the user's identity. In some embodiments, if user-authentication fails a predetermined number of times, the user authentication module can place the flashlight 110 in a fully locked state, requiring an override to unlock the flashlight 110.

In some embodiments, the module 212 includes a surveillance module. The surveillance module can be connected to the imaging device 220 to collect, store, analyze, and/or communicate the image data. For example, the surveillance module can collect the image data from the imaging device 220, create a local copy of the image data, then transmit the image data to a networked storage device (e.g., a cloud storage device). Accordingly, the surveillance module can facilitate review of the image data collected by the flashlight 110.

In some embodiments, the module 212 includes an animal detection module. Similar to the siren module, the animal detection module can automatically analyze and/or communicate the image data from the imaging device 220. In some embodiments, the animal detection module can analyze the image data to identify animals in the illuminated area (e.g., bears, mountain lions, bison, wolves, coyotes, etc.) and notify the user of their presence. In some embodiments, the animal detection module can include one or more speakers and/or a memory storing animal-specific instructions for the user. The speakers can provide the user with instructions based on the identified animal and a predetermined course of action. Alternatively, or additionally, the speakers can emit sounds configured to disorient and/or ward off the identified animal.

In some embodiments, the module 212 includes an environmental data collection module. In some embodiments, the environmental data collection module can be operably connected to the imaging device 220 to collect and/or analyze the image data. In some embodiments, the environmental data collection module includes one or more sensors configured to collect additional data on the environment around the flashlight 110. The sensors can include one or more of the following: a chemical sensor (e.g., a particle counter, an optical sensor, electrochemical sensor, mass sensor, magnetic sensor, thermal-chemical sensor, etc.), a smoke detector, a sensor configured to detect the presence of airborne and/or surface pathogens, an infrared imaging device, a LiDAR device, a motion detector, a temperature sensor, a humidity sensor, an altitude sensor, a GPS device, and/or various other suitable sensors.

The environmental data module can measure and record data on various environmental conditions around the flashlight 110 using the measurements from the imaging device 220 and/or any of the sensors discussed above. For example, the environmental data module can generate a visual model of the area around the flashlight 110 using the image data and/or data from an additional LiDAR device. The environmental data module can perform chemical measurements and/or alert the user to harmful levels of chemicals (e.g., dangerous levels of carbon monoxide) when detected. The environmental data module can record the chemical measurements to create a record of the user's exposure to chemicals while using the flashlight 110. The environmental data module can generate a map of recorded chemicals and/or chemical levels (e.g., using the GPS device to record position when chemicals are detected). The environmental data module can record detect potential exposures to pathogens, alert the user to the presence of the detected pathogens, and/or instruct the user on safety protocols in view of the potential exposures. For example, when a pathogen (e.g., SARS-COV-2) is detected, the environmental data module can alert the user to the detection and provide behavioral instructions to minimize further exposures. The environmental data module can also sample air to measure gas levels, detect the presence of harmful gases, detect contamination levels, count particles, or the like.

In some embodiments, the environmental data module can include a computer processing system running a machine learning algorithm to identify trends in the environmental data. For example, the machine learning algorithm can mine the data to identify locations (e.g., using GPS data) that consistently have elevated levels of a chemical (e.g., using data from one or more chemical sensors), to measure gas levels, to detect airborne virus, etc. The environmental data module can then alert the user of the flashlight 110 as the user approaches an area identified as likely to have elevated levels of a chemical, gas emissions, etc.

In some embodiments, the module 212 includes a GPS location module. The GPS location module can include a GPS device to track the location of the flashlight 110. In some embodiments, the location of the flashlight can be stored in a memory, communicated to other modules, and/or communicated to various external locations (e.g., a linked emergency service). In some embodiments, the GPS location module includes a screen and one or more input components (e.g., a touchscreen, input buttons located on the module, voice control component, or other suitable input component) to receive inputs from the user. The GPS location module can display a current location, a map, and/or recent locations via the screen. The GPS location module can receive inputs from the user to mark a waypoint, generate directions to a location, track location, communicate a location, and/or perform any other suitable action.

In some embodiments, the module 212 includes a voice control module. The voice control module can include one or more microphones and a computer system configured to respond to voice commands. In some embodiments, the voice control module can include a virtual assistant (e.g., Amazon Alexa, Google Assistant, Apple Siri, Microsoft Cortana, Samsung Bixby, or any other virtual assistant). Accordingly, the voice control module can receive voice commands from the user and execute the command. In some embodiments, the voice control module can be operably coupled to one or more other modules to execute the commands. For example, the voice control module can be operably coupled to the siren module to execute a command to call for emergency services. In some embodiments, the voice control module can communicate with one or more remote devices (e.g., a user's smart phone, a remote virtual assistant, a cloud network, or any other suitable devices) to execute the commands.

In some embodiments, a single module 212 can include one or more of the modules discussed above. For example, in some embodiments, the module 212 can include the siren module, the environmental data module, and the voice control module in a single extension. In some embodiments, each module 212 can recognize the other modules attached to the flashlight 110 and operably interconnect. For example, the siren module can recognize the environmental data module and communicate relevant environmental data to emergency services if an emergency call is activated. In another example, the voice control module can recognize the siren module and receive voice commands to activate one or more functionalities of the siren module (e.g., can receive a voice command to call emergency services, allowing the user to call for help even if they are physically separated from the flashlight 110).

As discussed in more detail below with respect to FIGS. 4 and 5, in some embodiments, a rechargeable battery (not shown) can be removed from the flashlight for recharging using a cradle or cord. In some embodiments, the rechargeable battery can be recharged while remaining within the flashlight 110. In other embodiments, the flashlight can include non-rechargeable power sources (e.g., one or more non-rechargeable batteries).

Further, as discussed in more detail below with respect to FIG. 3, the flashlight 110 can include a central processing unit, memory, input devices (e.g., switches, keyboards, touchscreens), output devices (e.g., speakers, display devices), storage devices (e.g., disk drives), and various other software and/or hardware components (not shown). The central processing unit can be a microcontroller. In some embodiments, the central processing unit can include one or more processors, which can be a single processing unit or multiple processing units distributed across multiple devices. Processors can be coupled to other hardware devices, for example, with the use of a bus, such as a PCI bus or SCSI bus. Processors can also be standard central processing units or secure processors, and secure processors can be special-purpose processors (e.g., reduced instruction set processors) that can withstand sophisticated attacks that attempt to extract data or programming logic. A secure processor may not have debugging pins that enable an external debugger to monitor the secure processor's execution or registers. In other embodiments, the flashlights may employ a secure field programmable gate array, a smartcard, or other secure devices. Other types of computing devices can also be used. In local processing embodiments, edge computing can be used to detect trigger events, perform facial recognition, assess security threats, or combinations thereof using one or more AI algorithms, machine-learning algorithms, or the like. The flashlight 110 can receive, for example, one or more settings, software modules, algorithms, or the like. The settings can include, without limitation, one or more detection accuracy settings, sensitivity settings, alert settings, or the like. The software modules can include, without limitation, OTA software (e.g., updates, training libraries for ML, etc.), communication protocols, or the like. The algorithms can include, without limitation, digital data processing algorithms, detection algorithms (e.g., ML algorithms for detecting/identifying noises, such as gunshots), or the like. The information and data received by a flashlight 110 can be selected based on the action(s) to be performed.

The flashlight 110 can communicate with other flashlight(s) and/or connected device(s). In some implementations, the flashlight 110 can receive software module(s) based on one or more environmental settings. For example, if a system identifies a firearm-related emergency event, the system can transmit firearm software modules to the flashlight 110 to analyze guns (e.g., to detect location of firearm discharge, type of firearm, etc.), activities typically preceding gunshots (e.g., mob or protestor movement), etc. The systems can dynamically provide resources to the flashlight 110 to improve accuracy and/or detection capabilities. In some embodiments, a plurality of flashlights can communicate with each other via a local network (e.g., Wi-Fi network, a mesh network, etc.), direct connections, or the like and one or more of the flashlights can perform local processing (e.g., edge computing) to, for example, provide geolocation capabilities. The flashlight can also communicate with surveillance devices, such as cameras, motion detectors, or the like. The flashlights and surveillance devices can cross-communicate to perform triangulation routines to detect the location of gunshots, explosions, and other events. In some embodiments, the flashlights can cross-communicate and then periodically transmit data via a wide area network to a cloud-based surveillance system. The cloud-based system can perform one or more routines (e.g., triangulation routines, detection routines, or the like) and provide analytics that are transmitted back to the flashlight 110 and/or another user device.

A remote service center (e.g., a call center, a management center, a subscription monitoring service, etc.) can receive data from the flashlight 110. In some implementations, the remote service center can be an emergency response service center operated by a government agency, such as a police department, federal agency (e.g., FBI), or the like. To respond to a mass shooting or potential shooter, the flashlight 110 can provide on-site monitoring. For example, the flashlight can be carried by a police officer or responder, be attached to a firearm (e.g., handgun, rifle, etc.), or other suitable devices. The flashlight 110 can automatically monitor and provide information to other local connected devices and the remote service center. If a firearm is discharged, the flashlight can provide acoustic data that is used in combination with acoustic data from other on-site devices to determine (e.g., via triangulation or another technique) the location of the firearm discharge. This information can then be communicated to on-site personnel who can determine the course of action based on the location of the firearm discharge. In some implementations, the remote service center can be an emergency response service center for firefighters. The flashlight 110 can automatically transmit captured data to the service center. The service center can use the captured data to map an emergency site (e.g., a portion of a city with a protest, a burning building or landscape), geographic location, or other site to develop monitoring and/or response plans. At remote locations, the flashlight 110 may be unable to establish a stable or suitable channel via wide area network. The flashlights 110 can communicate with each other for monitoring and providing local computing and analytics.

Figure 3:
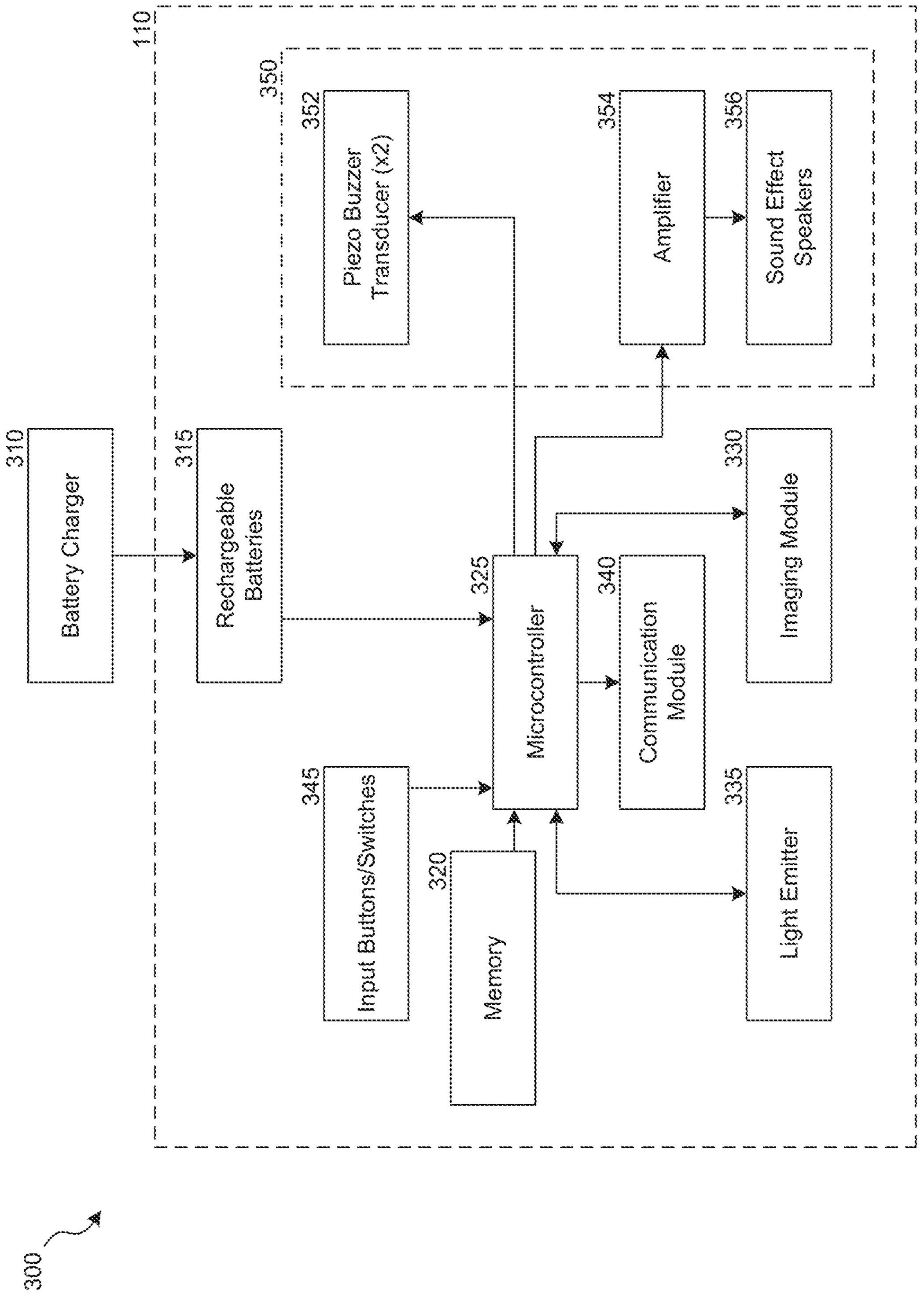
FIG. 3 illustrates components of a flashlight system in accordance with embodiments of the disclosure.

FIG. 3 illustrates components of a flashlight system 300 in accordance with an embodiment of the disclosure. The flashlight system 300 can include the flashlight 110 and a battery charger 310 that can operably couple to the flashlight 110. The flashlight 110 includes rechargeable batteries 315 electrically coupled to a processor or microcontroller 325 ("microcontroller 325"). The microcontroller 325 is operably connected to memory and storage devices 320, a recording or imaging module 330 (e.g., the imaging device 220 of FIG. 2), a light emitter 335 (e.g., the light emitter 200 of FIG. 2), a communication module 340, one or more input buttons/switches 345, and a removable module 350. In the illustrated embodiment, the removable module 350 is a siren module that includes a buzzer 352, an amplifier 354, and sound effect speakers 356. The battery charger 310 can charge the rechargeable batteries 315, which then provide power to the microcontroller 325 and any of the other components controlled therein.

The microcontroller 325 can communicate with the other components to control operation of the flashlight 110. For example, the microcontroller 325 can toggle the light emitter 335 between on and off positions to control the light emitted from the flashlight, command the imaging module 330 to record image data, and/or send one or more signals to the amplifier to play alarm sounds through the speakers 356. The microcontroller 325 can also provide the primary computer functionality for the flashlight 110, including storing data (e.g., firmware, software for modules, algorithms, machine learning models, authentication programs, etc.), user settings, captured data, GPS data, communication protocol data in the memory and storage devices 320 and executing the functionality of one or more modules 212 (FIG. 2) attached to the flashlight 110. The microcontroller 325 can communicate with the memory and storage devices 320 for storing data, the communication module 340 for wireless communication, and various other components of the flashlight 110 to control data recording, lights, sirens and communication with cloud-based emergency and storage services.

The memory and storage devices 320 can be computer-readable storage media that may be encoded with computer-executable instructions that implement the technology, which means a computer-readable storage medium that stores the instructions. In addition, the instructions, data structures, and message structures may be transmitted via a computer-readable transmission medium, such as a signal on a communications link. Thus, "computer-readable media" includes both computer-readable storage media for storing information and computer-readable transmission media for transmitting information. Additionally, data used by the disclosed techniques may be encrypted. Various communications links may be used, such as the Internet, a LAN, a WAN, a point-to-point dial-up connection, a cell phone network, wireless networks, and so on.

The imaging module 330 can be part of the light system and record interaction on to the memory and storage devices 320 and/or another memory (such as a solid-state memory card or internal storage, not shown) dedicated to the imaging module 330. In a constant record mode, the user can select a recording after an event occurs for storage. The microcontroller 325 can also control the light emitter 335 to notify the user that recording is taking place (e.g., through a red LED in the light field turning on). The imaging module 330 can have the ability to record audio.

The light emitter 335 can emit light from one or more LEDS, light bulbs, ultraviolet light source (e.g., germicidal UV light source, UVC light source, etc.), infrared light source, or other light sources. The purpose of the light can be to provide illumination as well as to disorient subjects that are in the field of light (e.g., a conical field of light) emitted from the light emitter 335. The emitted light can be very bright and also have the ability to strobe in order to disorient a person or deter a potential threat. The strobe effect can be able to save power as well as add disorientation and be activated through the switches or preset through one or more of the modules discussed above with respect to FIG. 2. In some embodiments, selected wavelength(s) or waveband(s) are emitted sequentially to perform a disorientation routine, detection routines, irradiation routines (e.g., germicidal routines, sanitization routines, etc.), or other routines.

The communication module allows the flashlight 110 to wirelessly communicate with a network or device. For example, the communication module 340 can communicate via Z-Wave protocols that allows the flashlight 110 to talk to a smart home security system that could then be used to trigger an action throughout the home. The communication can be performed through Wi-Fi, Zigbee, or a proprietary wireless protocol. The communication module can also be cellular or GPS-based. In some embodiments, one or more of the input buttons 345 can be dedicated to the communication module 340 to prompt the communication link and/or to communicate a state of user distress through the communication link. As communication protocols change and update, the communication module 340 can be replaced with another communication module to allow reuse of the other components of the flashlight.

Communication modules can be developed and offered for a variety of "consumer" and "industry" needs and applications: Zigbee, GPS, cellular, Wi-Fi, Bluetooth. Modules can enable pan/tilt/zoom of cameras, geofencing, enhanced vision (e.g., lowlight vision, night vision), alarms, siren, two-way communication, or combinations thereof. Data can be stored locally via internal memory or external memory, such as USB drives, SD drives, or the like. In other embodiments, data can be stored via cloud storage.

Figure 4:
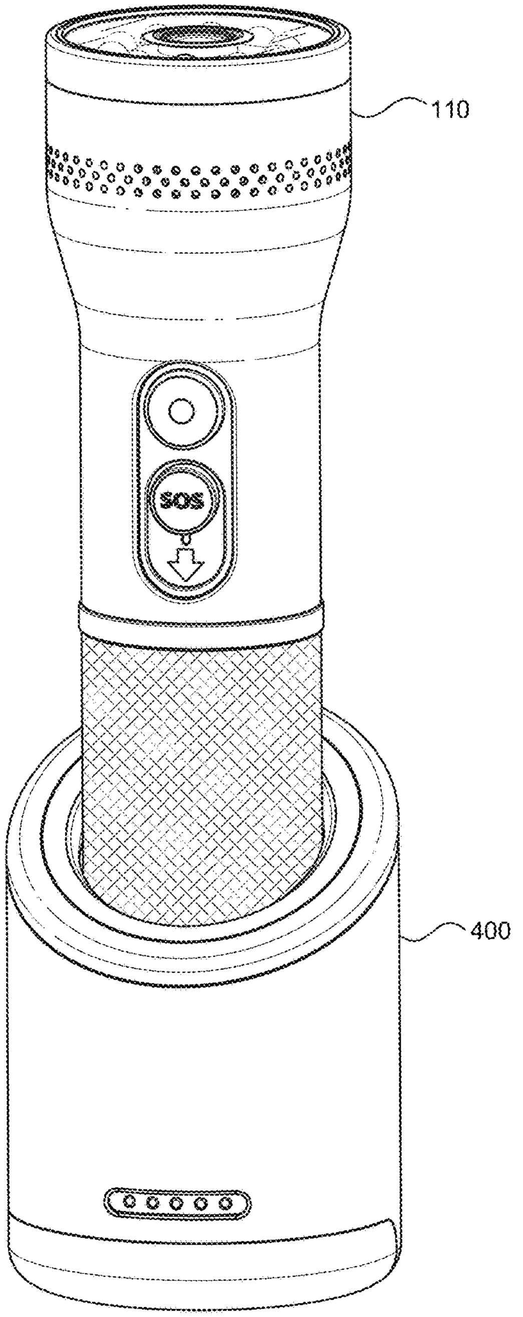
FIG. 4 is an isometric front view of a flashlight system including a flashlight and a recharging base in accordance with embodiments of the disclosure.

FIG. 4 is an isometric front view of a flashlight system including the flashlight 110 and a recharging base 400 ("base 400") in accordance with an embodiment of the disclosure. The base 400 can charge a rechargeable power source of the flashlight 110. Additionally, or alternatively, the base 400 can function as a communications dock that receives data (e.g., wire connection, wireless connection, or other connection) via a from the flashlight 110. The base 400 can cause the received data to load to a remote server or device. In some embodiments, the base 400 can function as an Internet of Things (IoT) hub that controls other non-surveillance devices, such as speakers, televisions, light sources, or the like. The base 400 can also have the ability to interact with the flashlight 110 and/or user. The base 400 could trigger a find-flashlight function for the flashlight 110. For example, when a user activates a find flashlight protocol, the base 400 can transmit commands to the flashlight 110 to cause a flashlight 110 to emit audible noises to help the user find the flashlight 110. In some embodiments, the base 400 can function as a communication hub that is part of a network. For example, the base 400 can function as repeater to extend the communication range of a network and can communicate according to different protocols. This enables different types of devices to communicate with one another.

The base 400 can be configured to provide surveillance capabilities and can include one or more motion sensors, cameras, speakers, microphones, chemical sensors, water sensors, gas sensors, temperature sensors, humidity sensors, light sensors, microphones, or the like. In one setting, the base 400 can have a motion sensor to detect motion within a surveillance area. If motion is detected, the base 400 sends instructions to cause one or more lights to be turned on. The base 400 can also include a siren to alert others and can interact directly or indirectly with smart home loT devices, such as lighting systems.

Figure 5:
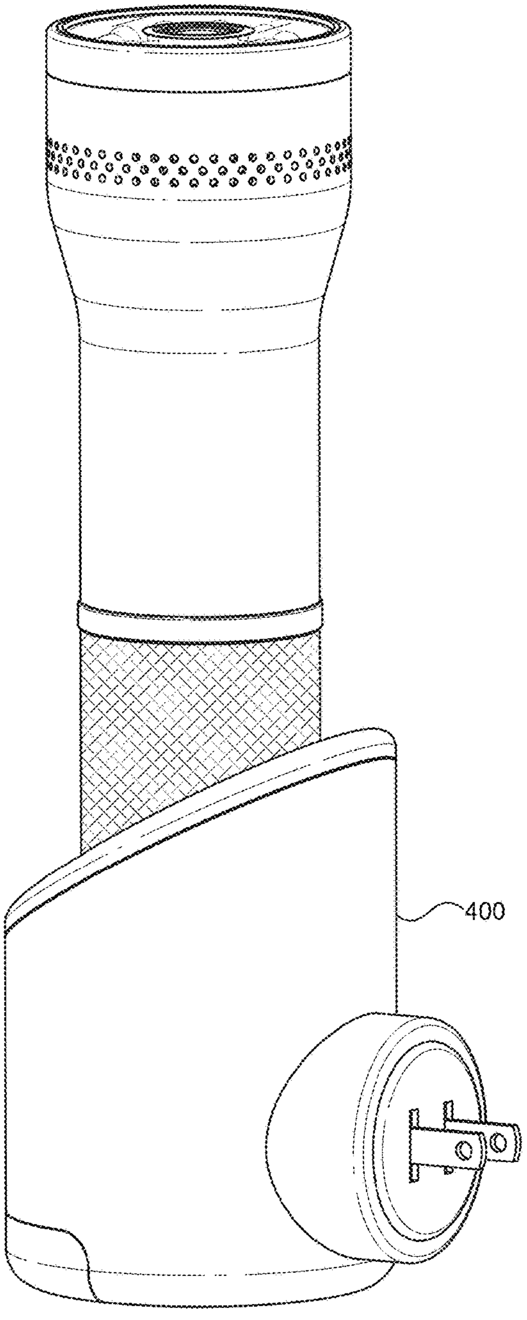
FIG. 5 is an isometric back view of the flashlight system of FIG. 4.

FIG. 5 is an isometric back view of the flashlight system of FIG. 4. The base 400 can include a plug configured to be inserted into an outlet. In some embodiments, electrical contacts provide interface between the flashlight 110 and the base 400. In other embodiments, the flashlight 110 is inductively charged.

Figure 6:
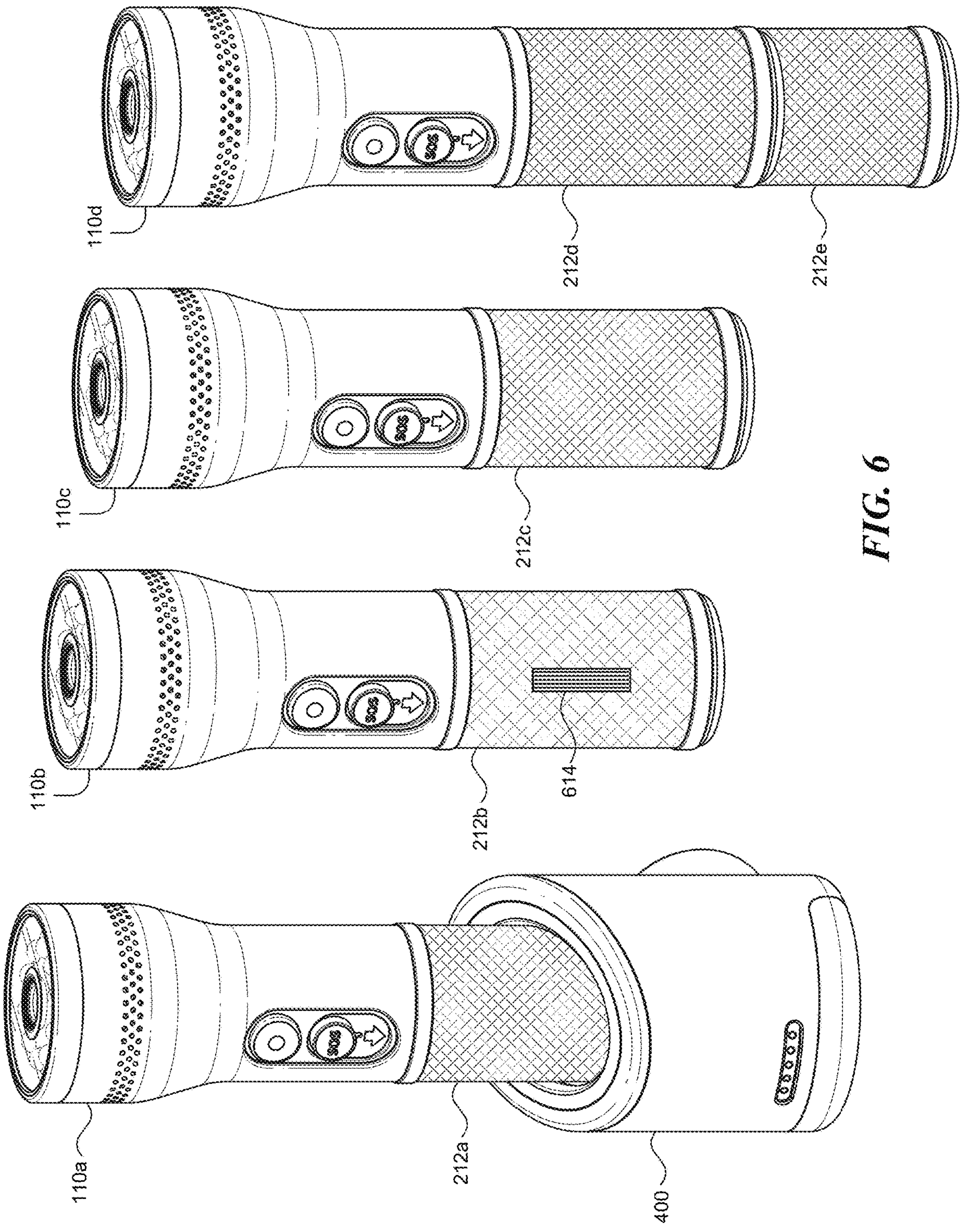
FIG. 6 is an isometric view of flashlights and a single recharging base in accordance with embodiments of the disclosure.

FIG. 6 is an isometric view of a flashlight system 600 in accordance with embodiments of the disclosure. In the illustrated embodiment, the flashlight system 600 includes a single base 400 and four flashlights 110*a-d* (collectively "flashlights 110"). Each of the flashlights 110 have different configurations (e.g., different modules). For example, flashlight 110*a* includes a first module 212*a* and flashlight 110*b* includes a second module 212*b* that can be different the first module 212*a*. For example, the first module 212*a* can be a siren module (see, e.g., discussion of FIG. 2, supra), while the second module 212*b* can be an environmental data module. Flashlight 112*c* includes a third module 212*c* that can be different from, or similar to, the first and second modules 212*a*, 212*b*. For example, in some embodiments, the third module 212*c* can include at least some of the functionality of the siren module and the animal detection module. Accordingly, the first module 212*a* and the third module 212*c* can each include one or more speakers (not shown) that can emit notifications, alarm sounds, and/or instructions to the user. The second module 212*b* includes a sensor inlet 614 (e.g., an air inlet) that allows one or more sensors in the second module 212*b* to measure environmental data. For example, air flowing in through the sensor inlet 614 can be measured by a chemical sensor, a pathogen sensor, a temperature sensor, a humidity sensor, and/or various other suitable sensors. As further illustrated in FIG. 6, flashlight 110*d* has two connected modules 212*d*, 212*e*. The two connected modules 212*d*, 212*e* can be connected without tools, and can each provide the flashlight 110*d* with the functionality of one or more of the modules discussed above with respect to FIG. 2. The number, configuration, connectors (e.g., twist locks, lever locks, mechanical connectors, electrical connectors, etc.), and/or functionality of the modules 212 can be selected based on the use of the flashlight 110.

Each of the flashlights 110 can be communicatively linked to the base 400 to facilitate communication of one or more signals throughout the flashlight system 600. For example, in some embodiments, one flashlight 110 can send a distress signal to the base 400, which can repeat the signal to the remaining three flashlights 110. In some embodiments, each flashlight 110 can communicate directly with the other flashlights 110 in the flashlight system 600. Accordingly, in these embodiments, each flashlight 110 can send a signal directly to the other flashlights 110 and to the base 400. For example, a flashlight 110 can send a distress signal to the other flashlights 110 and the base 400. The other flashlights 110 can directly relay the signal to corresponding users, while the base 400 can relay the message on a broader network (e.g., can relay the message to emergency services). In some embodiments, the base 400 and flashlights 110 communicate to maintain a local mesh network, and the flashlights 110 can function as repeaters to extend the communication range of the mesh network. The flashlights 110 can automatically establish a communication channel with the nearest base to maintain local communications. In some embodiments, the flashlights 110 and base 400 include one or more interfaces configured to provide local, bi-directional communication with one another. The flashlights 110 and base 400 can include network interfaces configured to receive data from a remote management server via a wide area network. The network interfaces can also provide bi-directional communication. The flashlights 110 and base 400 can transmit data from another device to another device. For example, the base 400 can receive data from a first flashlight 110 and the send the data or notification based on the received data to another flashlight 110, smart phone, remote server. The base 400 and flashlights 110 can receive software (e.g., firmware, updates, etc.) via interfaces for communication via local networks, wide area networks, etc. The systems disclosed herein can compress and encrypt files for network back-up and enable remote access to flashlights via the web, IM client, etc. A remote service center can control operation flashlights and analyze the captured data remotely.

Figure 7:
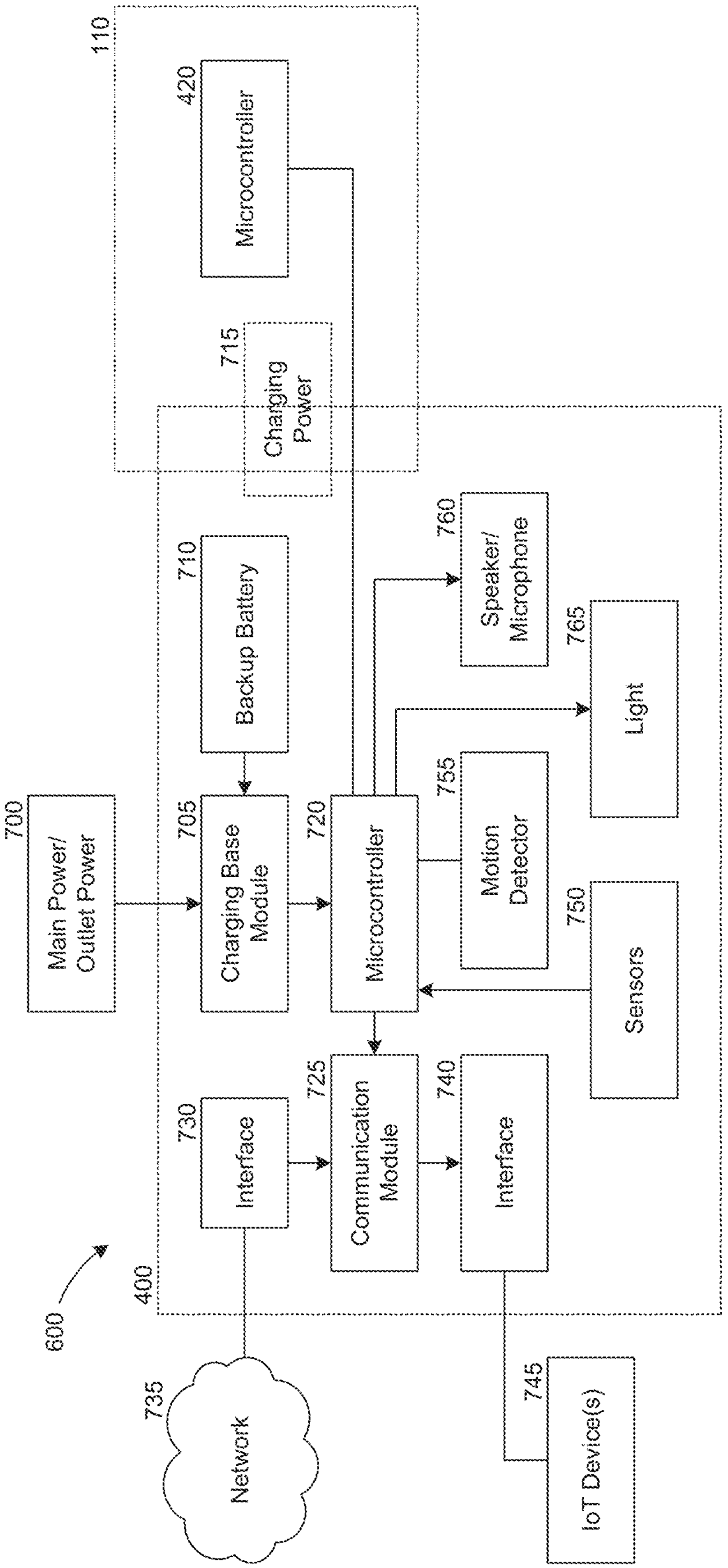
FIG. 7 illustrates components of a flashlight system in accordance with embodiments of the disclosure.

FIG. 7 illustrates components of a flashlight system 600 of the type shown in FIG. 6 in accordance with some embodiments of the present technology. As illustrated in FIG. 7, the base 400 can be connected to a main power source 700 (e.g., an outlet) to receive a constant power supply. Accordingly, the base 400 can operate continuously. In the illustrated embodiment, the base 400 also includes a charging base module 705 that can be used to charge a backup battery 710 for the base 400 and/or provide a power connection 715 to charge a connected flashlight 110. In some embodiments, the base 400 can be used to charge each of the flashlights 110 in the flashlight system 600, despite each flashlight 110 having a different configuration (e.g., based on different attached modules).

As further illustrated in FIG. 7, the base 400 also includes a processor or microcontroller 720 ("microcontroller 720") that is operably coupled to a communication module 725. As illustrated, the communication module 725 can be coupled to a wireless interface 730 that allows the base 400 to communicate with a network 735 and an interface 740 that allows the base 400 to communicate with one or more loT devices 745 using shortrange communication. The base 400 can communicate with the network 735 to download software updates, communicate data, store data in a network server (e.g., a cloud server), contact external devices and/or entities, and/or perform various other functions. The base 400 can communicate with loT devices 745, such as flashlights 110, an loT hub, a virtual assistant (e.g., Google Home, Microsoft Cortana, Amazon Alexa, etc.), and/or various other suitable devices. Additionally, or alternatively, the base 400 can communicate with a gateway, hub, router, smart speaker, or electronic controller, such as Google Home, Amazon Echo, and/or various other network services.

As further illustrated in FIG. 7, the base 400 also includes one or more environmental data sensors 750 (e.g., imaging devices, proximity sensors, particle counters, chemical sensors, and/or pathogen sensors), a motion detector 755, a speaker and microphone 760, and a light 765 operably connected to the microcontroller 720.

The microcontroller can collect environmental data through the sensors 750 and motion detector 755 and communicate the collected data through the communication module 725. For example, the base 400 can detect the proximity of one flashlight 110 in the flashlight system 600, then initiate local communication with the flashlight 110.

The speaker and microphone 760 allow the base 400 to play audible sounds, record noise around the base, and/or receive verbal commands. In various embodiments, the base 400 can play alerts of intruders detected by the sensors 750 and motion detector 755, alert an intruder that another party has been contacted, provide audible instructions for connecting a flashlight 110, indicate a location of the base 400, and/or various other sounds. In some embodiments, the microcontroller 720 can analyze the sounds to identify the presence of objects in the sounds (e.g., recorded gunfire can automatically indicate the presence of a gun). In some embodiments, the base 400 can record audio, such as the sounds made by a detected intruder. And in some embodiments, the base 400 be controlled with one or more voice commands (e.g., initiated by a start-up word such as "Siri"

(Apple), "Alexa" (Amazon), "Cortana" (Microsoft), and/or various other suitable commands).

The light 765 can be controlled by the microcontroller 720 to indicate a status of the base 400 and/or a connected flashlight 110, indicate a location of the base 400, and/or to perform various other functions. For example, the light 765 can indicate a charging status for a connected flashlight 110. In another example, the light 765 can illuminate an area around the base 400 and can be controlled in accordance with any of the functions discussed above with respect to the light emitter 200 (FIG. 2) on the flashlight 110.

As further illustrated in FIG. 7, while a flashlight 110 is charging, the microcontroller 720 of the base 400 can connect to the microcontroller 420 of the connected flashlight 110 to, for example, retrieve data from the flashlight 110, program the microcontroller 420 and/or any of the modules on the flashlight, manage software updates for the flashlight 110, perform diagnostics on the flashlight 110, or any combinations thereof.

The systems disclosed herein can use one or more classifiers to identify signals in collected data, models for data analysis, etc., which can be employed by a remote server, flashlights, bases, modules, or another component. Bases and/or remote servers can identify signals in data collected by a set of flashlights. Flashlights can use classifiers to locally analyze data to reduce detection time and provide detection when a network connection is not available. In some embodiments, the flashlights (e.g., flashlights 110) can perform detection routines without concurrent communication with another device or server. This enables local detection to be performed locally at remote locations without network access. Modules (e.g., modules 212 discussed above) can independently use detection specific classifiers for processing flexibility. Classifiers can be used to predict whether certain data is a signal or indicates an event, such as a trigger event. To train the classifiers, variety of classier methods can be used, including but not limited to Neural Networks, Decision Trees, Deep Neural Network, Random Forests, Bayesian Networks, Support Vector Machines, and Logistic Regression.

The system can use training data to train classifiers. For each training data, the system may generate a feature vector that includes values for features describing the data's important characteristics. The system may label each feature vector as a signal or a noise. The system may then employ various machine learning models/techniques to train the classifier using the training data comprising the labeled feature vectors. After the classifier is trained, the system uses the classifier to identify signals in the retrieved data for the inquiry. To do this, the system generates a feature vector for each retrieved data. The system then applies the classifier to each feature vector to determine whether the data indicates a signal (e.g., an event) or a noise. Classifier can be employed to identify trigger events, signals based on data from multiple flashlights, etc. For example, a module configured to monitor environments, air-quality, detect the present of a gas, gas levels, etc. can include classifiers each trained for monitoring to be performed. An environment classifier can be trained to detect signals from data from light sensors, gas sensors, air quality sensors, etc. Air-quality classifiers can be trained to detect signals from data from gas analyzers or air quality sensors analyzers. Gas analyzers can include one or more sensors configured to acquire one or more air quality parameters, and the sensors can include, without limitation, carbon monoxide, carbon dioxide, VOC sensors, ammonia sensors, radon sensor, propane sensor, methane sensor, etc. Data from different locations can be used to determine origins of gases, such as the location of a gas leak or other emission source. The classifiers can be trained to identify facial features, animals, weapons, particles (e.g., airborne particles), count particles, gas leaks, excess emissions, or other events or target features. In some embodiments, contamination classifiers are used to detect contamination events using particle counting or other techniques. The number, functionality of classifiers, and modifications to classifiers (e.g., continuous or periodic training) can be selected based the desired detection capabilities.

Machine learning models can be of various types, such as convolutional neural networks, other types of neural networks (e.g., fully connected), decision trees, forests of classification trees, support vector machines, fuzzy logic, etc. A training procedure can include obtaining suitable training data set associated with a desired result, applying each training data set to the model, and updating model parameters based on comparison of model result to training set result. The neural network can be trained by obtaining a quantity of training items or data set. Each training item or data set can include input similar to or corresponding input the model will receive (e.g., when in use) a corresponding result (e.g., scored result). The input from each training item/data set can be supplied to the model to produce a result, which can be compared to the scored result. Model parameters can then be updated based on relationships between results. For example, the relationships can be based on how similar the model result is to the scored result and/or whether the score is positive or negative. A training procedure can include, without limitation, scoring, clustering, predictive analysis, etc.

In some embodiments, models can be trained using sets of data and corresponding scores for the result. Model parameters can be adjusted so that the model output is more like a confirmed new signal if it was useful, or less like the confirmed new signal if it was not a useful signal. The amount of adjustment to the model parameters can be selected based on criteria. For example, the adjustment can be a function of how the user or system rates usefulness of the new confirmed signal. The usefulness can be determined based on an inputted score (e.g., user's inputted score, third party score, etc.), rating, frequency of selecting the new confirmed signal, etc. In this manner, training can be performed to identify new signal detection for useful signals for events. Models can be also be trained to select signal detection algorithms based on the data set. The model parameters can be adjusted to select the signal detection algorithm more like confirmed signals detection. In some embodiments, a signal engine can use a signal classifier that generates one or more signals corresponding to identified characteristics. In some implementations, the signal generated by the signal classifier can be a vector or matrix. Spots in the vector or matrix can correspond to user characteristic preferences and the vector or matrix can have values filled corresponding to the identified user characteristics, preferences, etc. Training can be performed locally (e.g., via devices 142, 144 of FIG. 1) or remotely (e.g., via providers 120), for example.

Over-the-air (OTA) software retrieval, installation, and/or updating can be achieved via a network, including local networks, wide area networks, etc. The OTA installations and/or installation may also be used to calibrate or reconfigure various systems, bases (e.g., bases 400), flashlights (e.g., flashlights 110), or modules (e.g., modules 212). For example, the bases can communicate with remote update servers via a network to determine whether an update (e.g., configuration update, software update, etc.) is available. The bases can obtain available automatically or via user control. When a new module is installed, a flashlight system can retrieve data (e.g., software, updates, or other programs) for operating or communicating with the new module. The new module can include locally stored programs for establishing a secure connection for obtaining the data upon installation of the new module, user settings, etc. This allows additional modules and software to be installed and updated. In some embodiments, smart phones manage and provide software, updates, and setting to flashlights (e.g., via a Bluetooth connection, WiFi connection, etc.) Encryption, tokens, security keys, and other techniques can be used for identification, authentication, authorization, etc. In some embodiments, the flashlights obtain software when coupled to the base or another component via a wired connection, a wireless connection, an optical connection, or the like. In some embodiments, the user can select software to be installed. For example, if the user encounters an unexpected event, such as an emergency event threat presented by one or more intruders (e.g., an armed intruder), the user can enter information about the emergency event. The system can determine available software for installation on the flashlight. The system can retrieve and transmit the software for automatic installation on the flashlight. The software can include executable code to, for example, analyze environmental data, control the flashlight, determine notification settings, or the like. This allows a user to program the flashlight in real time for monitoring flexibility. In some implementations, the user can automatically download software for assisting with an active shooter event. The flashlight can monitor communications between responders, receive alerts and notifications from other flashlights or devices, monitor environmental data to detect gunshots, calculate the location of firearm discharges, identify suspects and/or hostages, form part of a mesh network, perform edge computing, or the like.

Figure 8:
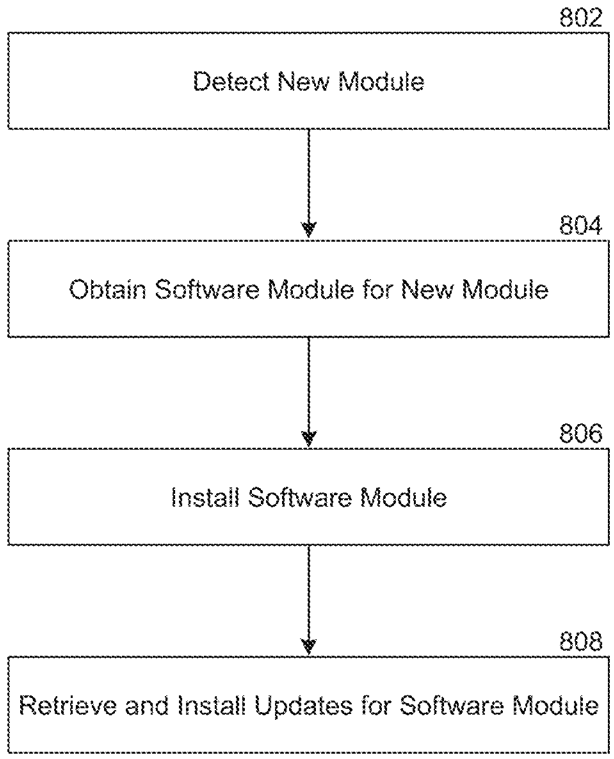
FIG. 8 shows a method of installing software in various components of a flashlight system in accordance with embodiments of the disclosure.

FIG. 8 shows a method of installing software in accordance with embodiments of the disclosure. At block 802, a system can detect a newly available module of a modular flashlight or newly available flashlight in a flashlight system. For example, detection can occur upon installation of a module (e.g., when the module 212 is mechanically coupled to the main module 210 of FIG. 2). Alternatively, modules can be detected when a flashlight is initially paired with a base or a newly available flashlight requests to join a network.

At block 804, the system can obtain software modules for bases, modules, flashlights, and/or other endpoint devices (such as motion sensors, smoke detectors, cameras, switches, light bulbs, and/or lighting units). For example, a flashlight can retrieve software modules (e.g., firmware, applications, executable programs, etc.) when a module is installed. In another example, a flashlight can retrieve and send software modules to other flashlights or endpoint devices. Bases can retrieve and send software modules to flashlights. The software modules can be retrieved via a local network or wide area network from smart phones, remote servers, or other software sources. In some embodiments, modules can be preloaded with software modules. When the module is connected to a flashlight, the flashlight can retrieve and send the software module to the base, other flashlights, and/or endpoint devices.

At block 806, the software module is installed by the system or components of the system. The software module can be installed upon receipt or based on a schedule or user input.

At block 808, updates to existing software modules or additional software for each software module can be retrieved and installed. The updates or additional software can be transmitted via one or more wireless interfaces to endpoint devices. In some embodiments, the system can repeat block 806 periodically to check for and install updates to the software modules installed in components of the system. For example, the system can check for an update daily, weekly, bi-weekly, monthly, or at any other suitable interval.

The herein described subject matter sometimes illustrates different components contained within, or connected with, different other components. It is to be understood that such depicted architectures are merely examples, and that in fact many other architectures can be implemented which achieve the same functionality. For example, embodiments of the technology have been in the form of flashlights. The technology can also be spotlights, body cameras, and other connected devices. In some embodiments, the flashlights 110 of FIGS. 1-7 can be rechargeable spotlights. In a conceptual sense, any arrangement of components and modules to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components (e.g., modules) so associated can also be viewed as being "operably connected," or "operably coupled," to each other to achieve the desired functionality, and any two components capable of being so associated can also be viewed as being "operably coupleable" to each other to achieve the desired functionality. Specific examples of operably coupleable include but are not limited to physically mateable and/or physically interacting components, wirelessly interactable and/or wirelessly interacting components, and/or logically interacting and/or logically interactable components. All patent applications, publication, and patents referenced herein are incorporated by reference in their entireties.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A rechargeable flashlight configured to communicate via a wireless network, the rechargeable flashlight comprising:
   - at least one light emitter configured to generate light outputted by the flashlight;
   - an imaging device configured to capture environmental data;
   - a cylindrical handheld main body including a plurality of functionally distinct modules configured to be detachably coupled together to provide coordinate operation; and
   - at least one user-controlled switch operable to control operation of one or more of the interchangeable cylindrical modules.

2. The flashlight of example 1, wherein the at least one light emitter is configured to output at least 500 lumens.

3. The flashlight of any of examples 1-2, wherein the at least one light emitter is configured to output at least 1,000 lumens.

4. The flashlight of any of examples 1-3, wherein the coordinate operation provides surveillance of a target surveillance area.

5. The flashlight of any of examples 1-4, wherein the functionally distinct surveillance modules include one or more cameras, microphones, motion detectors, and/or chemical sensors.

6. The flashlight of any of examples 1-6, wherein the imaging device and the at least one light emitter are part of one of the functionally distinct modules.

7. The flashlight of any of examples 1-7, wherein the plurality of functionally distinct modules includes at least one of a video recording module, a siren module, a speaker module, a computing module programmed to analyze the environmental data, or a communication module programmed to communicate via the wireless network.

8. The flashlight of any of examples 1-7, further comprising at least one controller programmed to automatically wirelessly send the captured environment data to a remote service to enable viewing of the captured environment data.

9. The flashlight of example 8, wherein the at least one controller is programmed to:

detect an event at a surveillance environment based on the environmental data captured by the imaging device, identify the detected event, and cause one of the functionally distinct modules to perform an action based on the identification of the detected event.

10. The flashlight of any of examples 1-9, further comprising analyzing the environmental data captured by the flashlight using object and/or facial recognition.

11. The flashlight of example 10, further comprising storing at least a portion of the environmental data, analysis of the environment data, and/or object and/or facial recognition output.

12. A flashlight configured to communicate via a wireless network, comprising:

a surveillance module including at least one light emitter configured to generate light outputted by the flashlight, and a camera; and a control module detachably coupleable to the surveillance module and configured to cause the flashlight to communicate via the wireless network based on images and/or video captured by the camera, wherein the control module includes at least one control element configured to be operated by a user to control operation of the flashlight.

13. The flashlight of example 12, further comprising a module detachably coupleable to the control module and configured to provide security functionality.

14. The flashlight of any of examples 12 and 13, wherein the security functionality includes at least one of emitting audible alerts, storing image data, or flashing light.

15. A flashlight having a flashlight-only mode for outputting light, a surveillance mode for capturing surveillance data, and a request assistance mode.

16. The flashlight of example 15, wherein the flashlight, in the flashlight-only mode, outputs light without capturing surveillance data.

17. The flashlight of any of examples 15 and 16, wherein the surveillance data includes video, still images, acoustical data, or combinations thereof.

18. The flashlight of any of examples 15-17, wherein the flashlight, in the request assistance mode is configured to send an SOS request in response to a user moving an SOS switch.

19. The flashlight of any of examples 15-19, wherein the flashlight is configured to be detachably coupled to a base charging system configured to operate as a light source, a motion sensor, and/or a speaker.

20. A system comprising;

a flashlight; and a mounting base configured to relay information from and to the flashlight.

21. The system of example 20, wherein the mounting base is configured to recharge one or more power sources of the flashlight.

22. A system comprising:

a flashlight; and a base charging station configured to be mounted to a device while allowing the flashlight to be couple to and removed from the base charging station.

23. The system of example 22, wherein the device includes a wall, a bicycle, a cup holder, a scooter, a cane, or furniture.

24. The system of any of examples 22 and 23, wherein the base charging station is a bike handlebar mount and/or a tool chest mount.

25. A flashlight configured to enable security functionality based on user authentication.

26. A modular flashlight, the modular flashlight comprising:

a main body having a first end and a second end, the main body including at least one input button carried by an exterior of the main body and an electronics system carried by an interior of the main body;

a light emitting module carried by the first end of the main body and operably coupled to the electronics system, wherein the light emitting module includes an array of emitters positioned to emit light away from the first end;

a removable module removably carried by the second end of the main body and operably coupled to the electronics system, wherein the main body and the module form a handle region for the modular flashlight.

27. The modular flashlight of example 26, wherein the removable module is a siren module configured to perform a security function including at least one of:

emitting a sound notification that emergency services have been contacted;

emitting a sound alert configured to disorient a listener; and cause one or more of the emitters in the array of emitters to start and stop emitting light repeatedly.

28. The modular flashlight of any of examples 26 and 27, wherein the removable module is an environmental data module that includes one or more sensors positioned to collect environmental data.

29. The modular flashlight of example 28, wherein the one or more sensors of the environmental data module includes at least one of the following:

a chemical sensor;

a pathogen sensor;

a LIDAR device;

a GPS sensor;

a temperature sensor;
a humidity sensor;
a motion detector; or
an infrared imaging device.

30. The modular flashlight of any of examples 28 and 29, wherein the one or more sensors of the environmental data module includes a pathogen sensor, and wherein the modular flashlight is configured to analyze the environmental data to detect a presence of one or more harmful pathogens and alert a user to the presence of the one or more harmful pathogens.

31. The modular flashlight of any of examples 28-30, wherein the one or more sensors of the environmental data module includes a chemical sensor, and wherein the module flashlight is configured to analyze the environmental data to detect a presence of one or more harmful chemicals to and alert a user to the presence of the one or more harmful chemicals.

32. The modular flashlight of any of examples 26-31, wherein the removable module is a GPS location module configured to track the location of the modular flashlight.

33. The modular flashlight of any of examples 26-32, wherein the removable module is a voice control module that includes a microphone, and wherein the voice control module is configured to receive voice commands via the microphone and to output commands for controlling the modular flashlight based the received voice commands.

34. The modular flashlight of any of examples 26-33, wherein the light emitting module further includes an imaging device positioned to collect image data of an area illuminated by the light from the array of emitters.

35. The modular flashlight of example 34, wherein the imaging device includes an infrared imaging device.

36. The modular flashlight of any of examples 34 and 35, wherein the imaging device includes a video imaging device.

37. The modular flashlight of any of examples 26-36, wherein the electronics system of the main body includes a communication module configured to wirelessly communicate with a network.

38. A flashlight system, comprising:
a first modular flashlight including:
a first main body having a first electronics system;
a first power supply operably coupled to the first electronics system;
a first light emitting module carried by the first main body and operably coupled to the first electronics system, wherein the light emitting module includes a first array of light emitting diodes (LEDs) positioned to emit light away from the first main body; and
a first removable module removably carried by the first main body and operably coupled to the first electronics system; and
a second modular flashlight including:
a second main body having a second electronics system;
a second power supply operably coupled to the second electronics system;
a second light emitting module carried the second main body and operably coupled to the second electronics system, wherein the light emitting module includes a second array of (LEDs) positioned to emit light away from the second main body; and
a second removable module removably carried by the second main body and operably coupled to the second electronics system; and
a base charging station having a charging area configured to receive the first modular flashlight and the second modular flashlight to charge the first power supply and the second power supply.

39. The system of example 39, wherein the first removable module has a first functionality and the second removable module has a second functionality different from the first functionality.

40. The system of any of examples 39 and 40 wherein each of the first modular flashlight, the second modular flashlight, and the base charging station are in wireless communication.

41. A system comprising:
at least one processor;
storage coupled to the at least one processor, the storage storing instructions that, when executed, configure the system to perform actions, including:
detecting a newly available module of a modular flashlight, wherein the modular flashlight is configured to operate with at least one other functionality distinct module, and
obtaining an executable software associated with the newly available module to provide control operation of the newly available module.

42. The system of example, wherein the modular flashlight includes the at least one processor and the storage, and wherein the modular flashlight includes one or more interfaces configured for wireless communication to wirelessly receive the executable software.

43. The system of any of examples 41 and 42, wherein the actions further include:
identifying the newly available module; and
authorizing the identified newly available module to enable operation of the authorized newly available module.

44. The system of any of examples 41-43, wherein the actions further include sending software to one or more endpoint devices in communication with the system via a local wireless network.

45. The system of example 44, wherein the one or more endpoint devices include motion sensors, smoke detectors, cameras, switches, light bulbs, and/or lighting unit.

46. The system of any of examples 41-45, wherein the actions further include authenticating the system for subscription-based services.

47. The system of any of examples 41-46, wherein the executable software includes one or more updates and/or firmware.

48. The system any of examples 41-47, wherein the actions further include causing the executable software to be automatically installed by the modular flashlight.

49. The system of any of examples 41-48, wherein the actions further include detecting the module when the module is mechanically coupled to a main module of the modular flashlight.

50. The system of any of examples 41-49, further comprising a base configured to hold and charge the modular flashlight, wherein the base obtains and sends the executable software to the modular flashlight.

51. The system of any of examples 41-50, wherein the modular flashlight includes a main module configured to provide functions enabled by the newly available module.

52. The system of any of examples 41-51, wherein the actions further include: receiving software updates for the newly available module; and sending the received software updates to the newly available module.

Conclusion

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:

1. A system comprising:
at least one processor;
storage coupled to the at least one processor, the storage storing instructions that, when
executed, configure the system to perform actions, including:
detecting a newly available module of a modular flashlight, wherein the modular flashlight is configured to operate with at least one other functionality distinct module,
identifying the newly available module,
authorizing the identified newly available module to enable operation of the authorized newly available module and
obtaining executable software associated with the newly available module to control operation of the newly available module.

2. The system of claim 1, wherein the modular flashlight includes the at least one processor and the storage, and wherein the modular flashlight further includes one or more interfaces configured for wireless communication to wirelessly receive the executable software.

3. A system comprising:
at least one processor:
storage coupled to the at least one processor the storage storing instructions that when executed, configure the system to perform actions including:
detecting a newly available module of a modular flashlight, wherein the modular flashlight is configured to operate with at least one other functionality distinct module, and
obtaining executable software associated with the newly available module to control operation of the newly available module;
sending, via a local wireless network, software to one or more endpoint devices; and wherein the one or more endpoint devices include motion sensors, smoke detectors, cameras, switches, light bulbs, and/or lighting units.

4. A system comprising:
at least one processor:
storage coupled to the at least one processor, the storage storing instructions that when executed, configure the system to perform actions, including:
detecting a newly available module of a modular flashlight, wherein the modular flashlight is configured to operate with at least one other functionality distinct module,
obtaining executable software associated with the newly available module to control operation of the newly available module, and
authenticating for subscription-based services.

5. The system of claim 1, wherein the executable software includes one or more updates and/or firmware.

6. The system of claim 1, wherein the actions further include causing the executable software to be automatically installed by the modular flashlight.

7. The system of claim 1, wherein the actions further include detecting the newly available module when the newly available module is mechanically coupled to a main module of the modular flashlight, wherein the main module is configured to control operation of the modular flashlight.

8. A system comprising:
at least one processor;
storage coupled to the at least one processor, the storage storing instructions that, when executed, configure the system to perform actions, including:
detecting a newly available module of a modular flashlight, wherein the modular flashlight is configured to operate with at least one other functionality distinct module obtaining executable software associated with the newly available module to control operation of the newly available module,
a base configured to hold and charge the modular flashlight, wherein the base obtains and sends the executable software to the modular flashlight.

9. The system of claim 1, wherein the modular flashlight includes a main module configured to provide functions enabled by the newly available module.

10. The system of claim 1, wherein the actions further include:
receiving software updates for the newly available module; and
sending the received software updates to the newly available module.

11. A flashlight, comprising:
a surveillance module including
at least one light emitter configured to generate light outputted by the flashlight,
a camera, and
a microphone;
a first user-controlled switch;
a second user-controlled switch; and
a controller in communication with the surveillance module and configured to cause the flashlight to communicate via a wireless network, wherein the controller has at least one processor;
storage coupled to the at least one processor, the storage storing instructions that, when executed, cause the flashlight to perform actions, including:
in response to operation of the first user-controlled switch,
automatically capturing images and/or video by the camera,
transmitting, via the wireless network, the capture images and/or video for viewing by an emergency services center,
establishing two-way voice communication with the emergency services center, and
in response to operation of the second user-controlled switch, activating the at least one light emitter and the camera.

12. The flashlight of claim 11, wherein the actions further include
emitting a sound notification indicating that emergency services have been contacted;
emitting a sound alert for disorienting a listener; and
causing the at least one light emitter to start and stop emitting light repeatedly.

13. The flashlight of claim 11, wherein the actions include GPS tracking of the flashlight.

14. The flashlight of claim 11, wherein the actions include activating an alarm of the flashlight to emit a sound.

15. The flashlight of claim 11, wherein the first user-controlled switch and the second user-controlled switch are configured to be operated independently.

16. The flashlight of claim 11, wherein the controller is configured to control the actions associated with operation of the first user-controlled switch based on user-inputted information inputted into a mobile device that communicates with the flashlight.

17. The flashlight of claim 11, wherein the actions include communicating with a mobile device programmed to wirelessly control operation of the flashlight.

18. The flashlight of claim 11, wherein the actions include pairing with a mobile device configured to wirelessly control operation of the flashlight.

* * * * *